UNITED STATES PATENT OFFICE.

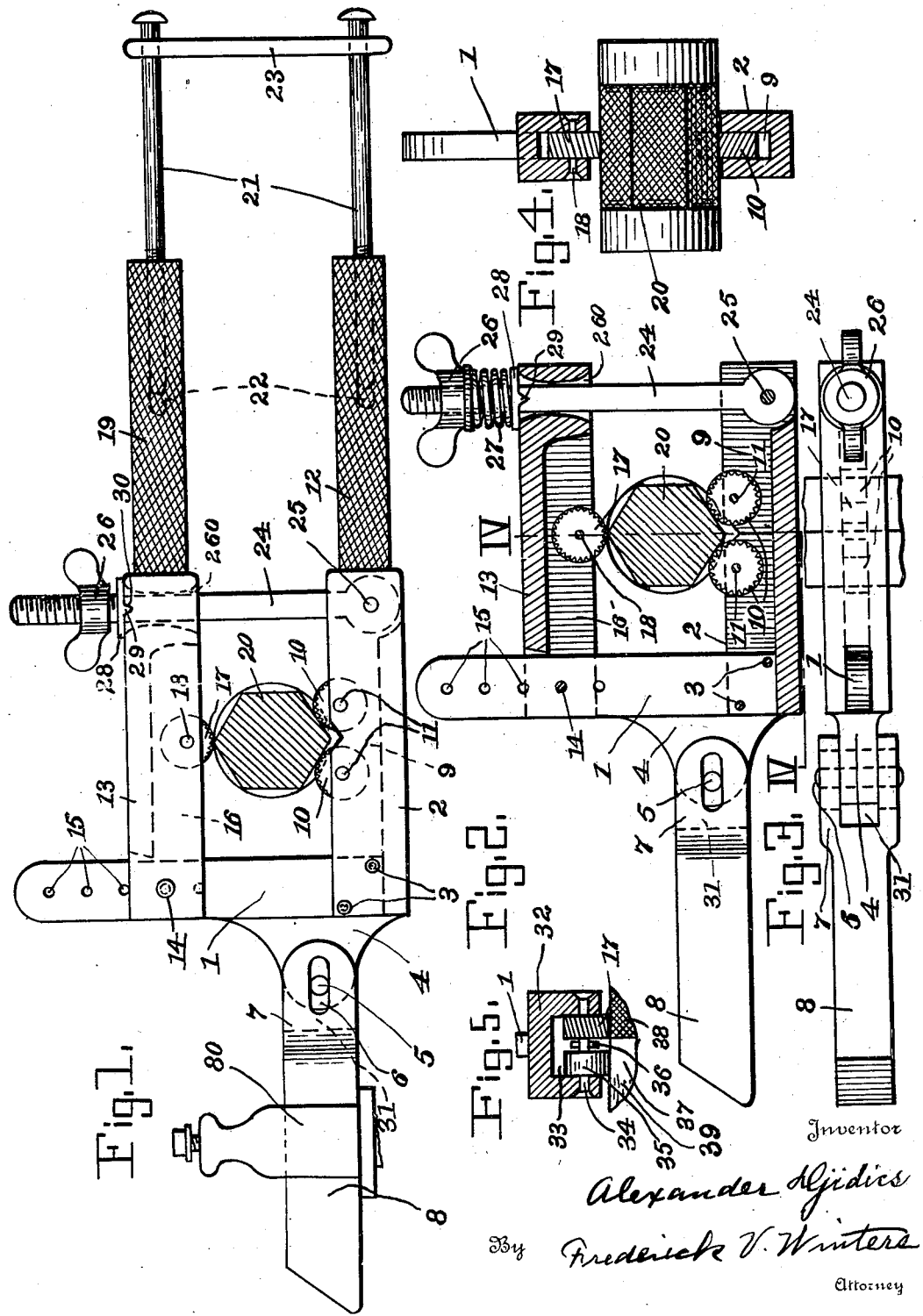

ALEXANDER DJIDICS, OF NEW YORK, N. Y.

NURLING-TOOL.

1,369,792.  Specification of Letters Patent.  Patented Mar. 1, 1921.

Application filed February 10, 1920. Serial No. 357,598.

*To all whom it may concern:*

Be it known that I, ALEXANDER DJIDICS, a citizen of Serbia, residing at New York, in the county and State of New York, have invented certain new and useful Improvements in Nurling-Tools, of which the following is a full, clear, and exact specification.

This invention relates to nurling tools, and has for its object to provide a tool of this kind which may be supported in the tool holder of a lathe in such a way that it may yield to compensate for irregular movements of the work. Another object is to adapt the tool to yield for the purpose of nurling articles having flat faces, so that said flat faces as well as the edges between said faces may be evenly knurled without injury to the tool. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation of a tool constructed substantially in accordance with this invention and showing a flat sided piece of work engaged thereby.

Fig. 2 is a central longitudinal section of a modified form of the tool.

Fig. 3 is a plan view of the form shown in Fig. 2.

Fig. 4 is a section on the line IV—IV of Fig. 2, and Fig. 5 is a section of a modified form of jaw carrying a smooth wheel as well as a nurling wheel.

A coupling member 1 is rigidly fastened to one jaw 2 of the tool, as by rivets 3, and has a projecting lug 4 formed thereon. Said lug has a smooth bored hole through it in which is engaged a slightly tapered pin 5. The ends of said pin project at opposite sides of the lug 4 into slots 6 in the bifurcated end portions 7 of a shank 8 adapted to be fastened in the tool stand or holder 80 on the carriage of a lathe (not shown) in a well known manner. The slots 6 permit the ends of the pin 5 to work loosely therein so that the tool may yield to compensate for irregularities in the turning of the work in the lathe, rather than holding said tool rigid which might result in breakage of the tool or work or both.

The jaw 2 has a recess formed at 9 in its upper or inner longitudinal face, and in this recess there are journaled two spaced nurling wheels 10, as by the cross pins or shafts 11. The recess may extend to the end of the jaw 2 and have the coupling member 1 seated therein, as shown. The outer end portion of the jaw 2 may be suitably finished to serve as a handle 12, as illustrated in Fig. 1, or said handle may be dispensed with, if desired, as indicated in Figs. 2 and 3.

Another jaw 13 is pivotally connected to the coupling member 1 by a pivot pin 14 engaging one of a plurality of spaced holes 15 in said coupling member, whereby a wide range of adjustments of the jaw 13 may be made with respect to the jaw 2. The jaw 13 has a recess 16 in its face opposite the recess 9 in the jaw 2, and in said recess 16 a single nurling wheel 17 is journaled, as by the shaft 18, said wheel 17 being disposed opposite the intervening space between the pair of wheels 10 and overlapping portions of said wheels, as is usual. The jaw 13 may have its end portion finished to serve as a handle 19 extending substantially parallel to the handle 12, as shown in Fig. 1, or said handle 19 may also be dispensed with as shown in Fig. 2. When the handles are provided, they may be grasped by the hand of the operator and the necessary yielding pressure exerted thereon to hold the nurling wheels 10 and 17 in contact with the work 20. In case the strain should become too great on the hand, other means for yieldingly holding the handles in position to press the nurling wheels against the work is provided consisting of spring arms 21 inserted in bores 22 in the handles 12 and 19 and connected at their outer ends by a link 23. Said links may be made in assorted sizes to allow for various adjustments to accommodate work of different diameters. This yielding holding means is especially designed for use when work of uneven contour, that is elliptical or angular in cross section, is to be operated upon. Where cylindrical work is to be knurled, the jaws may be locked firmly together at the desired adjustment by means of a connecting bar 24 pivoted at 25 in the end portion of the recess 9 and extending through a passage 260 in the jaw 13. Said connecting bar 24 is screw threaded and carries a thumb nut 26 adapted to be tightened against the upper face of the jaw 13.

When the handles 12 and 19 are dispensed with, as illustrated in Figs. 2 and 3, the yielding pressure on the work may be obtained by interposing a coiled spring 27 between the jaw 13 and nut 26. This spring, or the spring arms 21 in the other form of the invention, may also be used for exerting a yielding pressure upon cylindrical work, if desired. However, for the purpose of illustration, a piece of work 20 having flat surfaces is shown in the drawings.

A washer 28, having a V-shaped lug 29 to engage in a similarly shaped notch 30 in the upper face of the jaw 13, may be interposed between said jaw and the spring 27 to form a bearing for the latter or for the nut 26 when the spring is not used, as indicated in Fig. 1. It will be noted that a space 31 is left between the end of the lug 4 and the inner end of the bifurcation in the shank 8, as best shown in Fig. 3, to permit free movement of said lug.

In many cases the exterior of the work to be knurled is rough and should be smoothed down before nurling. This may be done with the present tool by substituting a smooth wheel for each of the nurling wheels 10 and 17, or the jaws 2 and 13 may be made wider and provided with broader recesses to hold a smooth wheel and a nurling wheel on each shaft. In Fig. 5 the modification is shown applied to an upper jaw 32 having a broad recess 33 in which the shaft 34 carries a smooth wheel 35 as well as the nurling wheel 17, said wheels being separated by a cross pin 36 in the shaft 34. The smooth wheel is designed to precede the nurling wheel in contacting with the work, so that a rough piece of work 39, Fig. 5, may be first smoothed, as at 37, and then knurled, as at 38, by the same tool.

Having thus described my invention, what I claim as new and desire to secure by Letters Patent of the United States is:—

1. In a nurling tool, the combination with a pair of jaws carrying coöperating nurling wheels, of a lug on said tool, a shank to be engaged in the tool holder of a lathe and having bifurcated end portion embracing said lug, one of said parts having a slot and the other having a projecting pin extending into said slot for forming a loose compensating joint between said shank and lug for the purpose specified, and means for holding said jaws in position to press said wheels into contact with a piece of work.

2. In a nurling tool, the combination with a pair of jaws carrying coöperating nurling wheels, of means for adjustably connecting said jaws together at one end, and a spring interposed between said connection and one of the jaws for yieldingly pressing the wheels into contact with the work.

3. In a nurling tool, the combination with a pair of jaws, of wheels carried by said jaws for smoothing a piece of rough work, and other wheels also carried by said jaws for nurling the work after it has been smoothed.

4. In a nurling tool, the combination with a pair of jaws, of means carried by said jaws for smoothing a piece of rough work, and means also carried by said jaws for nurling said work after it has been smoothed.

5. In a nurling tool, the combination with a pair of jaws carrying coöperating wheels, of a connecting bar pivoted to one jaw and extending through a passage in the other jaw, a nut adjustable on said bar for varying the distance between the jaws, a spring interposed between said nut and jaw for yieldingly pressing the wheels into contact with the work, and a washer having a lug to engage a notch in the adjacent jaw, said washer being arranged between the spring and jaw.

In testimony whereof I have signed my name to this specification.

ALEXANDER DJIDICS.